(12) United States Patent
Ross

(10) Patent No.: US 9,517,862 B2
(45) Date of Patent: Dec. 13, 2016

(54) THERMOPLASTIC BAG

(71) Applicant: Poly-America, L.P., Grand Prairie, TX (US)

(72) Inventor: Michael A. Ross, Westlake, TX (US)

(73) Assignee: Poly-America, L.P., Grand Prairie, TX (US)

( * ) Notice: Subject to any disclaimer, the term of this patent is extended or adjusted under 35 U.S.C. 154(b) by 26 days.

(21) Appl. No.: 14/243,117

(22) Filed: Apr. 2, 2014

(65) Prior Publication Data

US 2015/0284146 A1   Oct. 8, 2015

(51) Int. Cl.
| | | |
|---|---|---|
| *B65D 33/00* | (2006.01) | |
| *B65D 33/02* | (2006.01) | |
| *B65D 33/28* | (2006.01) | |
| *B65F 1/00* | (2006.01) | |
| *B29C 51/00* | (2006.01) | |
| *B29C 63/00* | (2006.01) | |

(52) U.S. Cl.
CPC ............. *B65D 33/00* (2013.01); *B29C 51/00* (2013.01); *B29C 63/00* (2013.01); *B65D 33/02* (2013.01); *B65D 33/28* (2013.01); *B65F 1/00* (2013.01); *B65F 1/0006* (2013.01)

(58) Field of Classification Search
CPC ......... B65D 29/02; B65D 31/00; B65D 31/02; B65D 31/10; B65D 31/16; B65D 33/00; B65D 33/02; B65D 33/08; B65F 1/00; B65F 1/0006; B29C 51/00; B29C 63/00
USPC .................................................. 383/118–120
See application file for complete search history.

(56) References Cited

U.S. PATENT DOCUMENTS

| | | | | |
|---|---|---|---|---|
| 3,069,067 | A * | 12/1962 | Crane ...................... | 229/87.08 |
| 3,550,842 | A * | 12/1970 | Scholz .................. | B65D 29/04 |
| | | | | 229/87.08 |
| 3,603,369 | A * | 9/1971 | Scholz .................. | B65D 65/00 |
| | | | | 229/87.08 |
| 3,832,267 | A * | 8/1974 | Liu ................................ | 428/167 |
| 3,958,751 | A * | 5/1976 | Bruno ....................... | 229/87.08 |
| 4,401,427 | A * | 8/1983 | Benoit et al. ............... | 493/199 |
| 5,205,650 | A * | 4/1993 | Rasmussen ................ | 383/107 |
| 5,330,133 | A * | 7/1994 | Rasmussen ................ | 244/145 |
| 5,518,801 | A | 5/1996 | Chappell | |
| 5,650,214 | A | 7/1997 | Anderson | |
| D402,121 | S | 12/1998 | Anderson | |
| 6,113,269 | A * | 9/2000 | DeMatteis et al. .......... | 383/103 |
| 6,394,651 | B2 | 5/2002 | Jackson | |
| 6,394,652 | B2 | 5/2002 | Meyer | |
| 6,513,975 | B1 * | 2/2003 | Jackson et al. ............... | 383/118 |
| 6,695,476 | B2 | 2/2004 | Jackson | |
| D518,648 | S | 4/2006 | Broering | |
| 8,794,835 | B2 * | 8/2014 | Wilcoxen et al. ............ | 383/118 |
| 2002/0003910 | A1 * | 1/2002 | Jackson ........................ | 383/75 |
| 2002/0126919 | A1 * | 9/2002 | Jackson et al. ............... | 383/42 |

\* cited by examiner

*Primary Examiner* — Peter Helvey
(74) *Attorney, Agent, or Firm* — Daniel J. Layden; Brandon J. Lee

(57) ABSTRACT

The present invention relates to a thermoplastic bag having enhanced capacity without significantly compromising dart impact properties. The thermoplastic bag has an area of induced elasticity that provides enhanced capacity, the area of induced elasticity generally surrounded by an area lacking induced elasticity.

18 Claims, 2 Drawing Sheets

THERMOPLASTIC BAG

CROSS-REFERENCE TO RELATED APPLICATIONS

Not applicable.

BACKGROUND OF THE INVENTION

1. Field of the Invention

The present invention relates to improvements for thermoplastic films, particularly thermoplastic films used in the manufacture of bags including trash bags.

2. Description of the Related Art

Thermoplastic films are used in a variety of applications. For example, thermoplastic films are used in sheet form for applications such as drop cloths, vapor barriers, and protective covers. Thermoplastic films can also be converted into plastic bags, which may be used in a myriad of applications. The present invention is particularly useful to trash bags constructed from thermoplastic film, but the concepts and ideas described herein may be applied to other types of thermoplastic films and bags as well.

Depending on the application, the use of thermoplastic film presents technical challenges due to the fact that thermoplastic film is inherently soft and flexible. Specifically, thermoplastic films are susceptible to puncture and tear propagation. In some instances, it may be possible to increase the thickness of the film or select alternative polymers to enhance the physical properties of the film. However, these measures may increase both the weight and cost of the thermoplastic film. Moreover, such modifications of thermoplastic film may not be practical in every situation. In light of the technical challenges associated with thermoplastic film, techniques and solutions have been developed to address the need for improved shock absorption to reduce the likelihood of puncture. For example, it is known to impart stretched areas into thermoplastic films as a means of inducing shock absorption properties into the film.

U.S. Pat. No. 5,205,650, issued to Rasmussen and entitled Tubular Bag with Shock Absorber Band Tube for Making Such Bag, and Method for its Production, discloses using thermoplastic film material with stretchable zones wherein the film material has been stretched in a particular direction with adjacent unstretched zones that extend in substantially the same direction. The combination of the stretched zones and adjacent unstretched zones provides a shock absorber band intended to absorb energy when the bag is dropped. Specifically, when a bag is dropped or moved, the contents inside the bag exert additional outward forces that might otherwise puncture or penetrate the thermoplastic film. However, the shock absorber bands absorb some energy and may prevent puncture of the thermoplastic film.

Additional examples of a thermoplastic film material designed to stretch are disclosed in U.S. Pat. No. 5,518,801, issued to Chappell and entitled Web Materials Exhibiting Elastic-Like Behavior (hereafter Chappell '801), and U.S. Pat. No. 5,650,214, issued to Anderson and entitled Web Materials Exhibiting Elastic-Like Behavior and Soft Cloth-Like Texture (hereafter Anderson '214). In Chappell '801 and Anderson '214, as well as several closely related references, an arrangement of raised ribs is embossed into the thermoplastic film to provide a stretchable film. Anderson '214 further discloses using a plurality of embossed ribs defining diamond-shaped areas with a network of narrow, unembossed regions extending between the large number of diamond-shaped areas. In the disclosed embodiment of Anderson '214, the unembossed areas form a network of linear unembossed regions extending in two perpendicular directions. The stretch properties of these films created by the use of embossed and unembossed regions is frequently referred to as induced elasticity of the film, which facilitates elastic response in a particular direction across the area of the embossed regions and the narrow, unembossed regions separating the embossed regions.

While the foregoing references specifically address the desire to generally increase the shock absorption of the thermoplastic film to enhance the stretch properties, or induced elasticity, of the film, it is further known to provide regions of induced elasticity where the induced elasticity is oriented in different directions in different portions of the film or, more specifically, in a thermoplastic bag made from such film. For example, U.S. Pat. No. 6,394,651, issued to Jackson et al. and entitled Flexible Bags Having Enhanced Capacity and Enhanced Stability (hereafter Jackson '651), discloses a thermoplastic bag having an upper portion that has induced elasticity in a fill direction. i.e. along the length of the bag, while a lower portion of the bag has induced elasticity in a perpendicular direct, i.e. across the width of the bag. In the embodiment disclosed in Jackson '651, the boundaries between the areas of induced elasticity are straight and linear. As a result, a disproportionate amount of stress can be exerted along the straight boundaries, which can result in tears propagating along the boundaries. Additionally, substantially the entire surface area of the thermoplastic bag disclosed in Jackson '651 has induced elasticity. This negatively impacts the dart impact properties of the thermoplastic bag.

U.S. Pat. No. 6,513,975, issued to Jackson et al. and entitled Bag with Extensible Handles (hereafter Jackson '975), discloses additional embodiments of thermoplastic bags with multiple areas of induced elasticity in addition to the embodiment disclosed in Jackson '651. One additional embodiment disclosed in Jackson '975 has a lower portion with induced elasticity across the width of the bag, an upper, centrally-located area of induced elasticity in the fill direction, and additional areas of induced elasticity along the sides of the bag near the top with induced elasticity in an angular direction. Additionally, another embodiment disclosed in Jackson '975 discloses a thermoplastic bag with areas of induced elasticity extending along substantially the entire length of the bag, in the fill direction, separated by areas lacking induced elasticity. Like the embodiment of Jackson '651, these embodiments also feature boundaries for each of the areas of the induced elasticity that are straight and linear and, thus, can result in tears propagating along the boundaries. More importantly, in every depicted embodiment of Jackson '975, the area of induced elasticity exceeds 50% of the surface area of the film, which significantly reduces the dart impact properties of the film.

Ultimately, when applied to a thermoplastic bag, the foregoing teachings can result in additional capacity for a thermoplastic bag compared to a thermoplastic bag of the same dimensions without induced elasticity. However, the stretchable thermoplastic films described above are accompanied by certain disadvantages as well. In particular, the embossing of ribs across the surface area of the thermoplastic film necessarily thins the film and typically has a detrimental effect on the dart impact properties of the film. Additionally, disproportionate amounts of stress are exerted along straight boundaries between areas of induced elasticity and areas lacking the same resulting in a weakening of the film along straight boundaries. The thinner film has a greater likelihood of failing as a result of an item piercing the film.

In short, there is an increased likelihood of punctures being introduced into the film and, in some cases, of the propagation of tears across the surface of the thermoplastic film as well.

It would be advantageous to provide a thermoplastic bag that offers the advantage of increased capacity from induced elasticity without substantively sacrificing dart impact resistance across the surface of the thermoplastic film as a whole. The present invention addresses these needs.

SUMMARY OF THE PRESENT INVENTION

One embodiment of the present invention is directed to a thermoplastic plastic bag comprising a first panel and a second panel. In some embodiments, the first panel and the second panel are joined along a first side edge, a second side edge, and a bottom edge. Moreover, the first panel may have a first area of induced elasticity defined in the first panel with an area lacking induced elasticity surrounding the area of induced elasticity. In such cases, the first area of induced elasticity may not extend to the first side edge, the second side edge, nor the bottom edge of the first panel. Moreover, the first area of induced elasticity may cover between 10% and 30% of the first panel.

In some embodiments of the present invention, the first area of induced elasticity may cover between 20% and 25% of the first panel. Moreover, in some embodiments, the first area of induced elasticity is elliptical or generally elliptical in shape. To facilitate the induced elasticity, in some embodiments, the first area of induced elasticity may comprise a plurality of embossed ribs as known in the art.

Other embodiments of the present invention may include a second area of induced elasticity defined in the second panel. In such embodiments, the second area of induced elasticity may not extend to the first side edge, the second side edge, nor the bottom edge of the second panel. Moreover, the second area of induced elasticity may cover between 10% and 30% of the second panel. In another embodiment, the second area of induced elasticity may cover between 20% and 25% of the second panel. Further, in some embodiments, the second area of induced elasticity may be elliptical or generally elliptical in shape. And, to facilitate elasticity, in some embodiments, the second area of induced elasticity may comprise a plurality of embossed ribs.

BRIEF DESCRIPTION OF THE RELATED DRAWINGS

A full and complete understanding of the present invention may be obtained by reference to the detailed description of the present invention and certain embodiments when viewed with reference to the accompanying drawings. The drawings can be briefly described as follows.

DETAILED DESCRIPTION OF THE INVENTION

The present disclosure illustrates several embodiments of the present invention. It is not intended to provide an illustration or encompass all embodiments contemplated by the present invention. In view of the disclosure of the present invention contained herein, a person having ordinary skill in the art will recognize that innumerable modifications and insubstantial changes may be incorporated or otherwise included within the present invention without diverging from the spirit of the invention. Therefore, it is understood that the present invention is not limited to those embodiments disclosed herein. The appended claims are intended to more fully and accurately encompass the invention to the fullest extent possible, but it is fully appreciated that certain limitations on the use of particular terms are not intended to conclusively limit the scope of protection.

Figure 1:
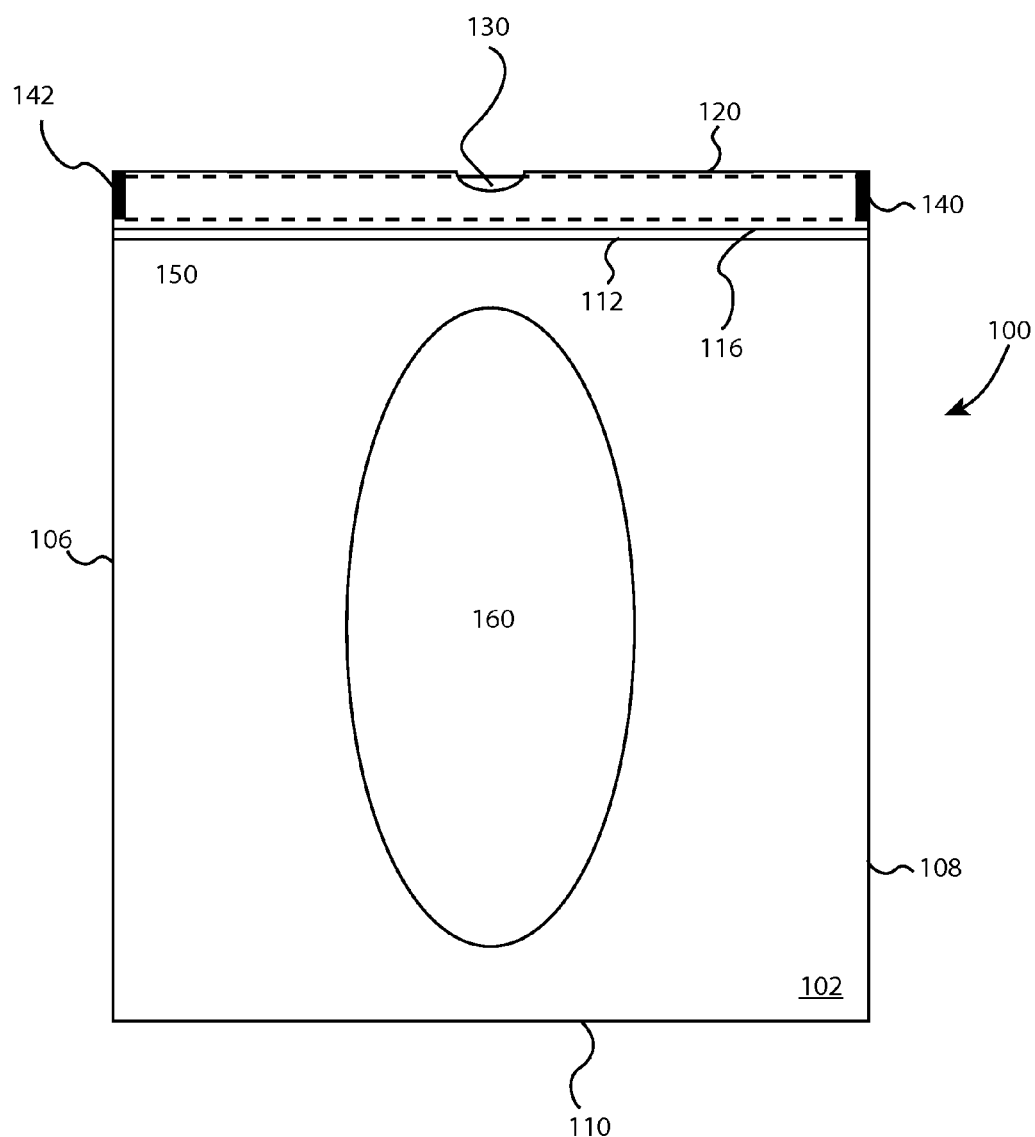
FIG. 1 depicts a front elevation view of an embodiment of the present invention.
Figure 2:
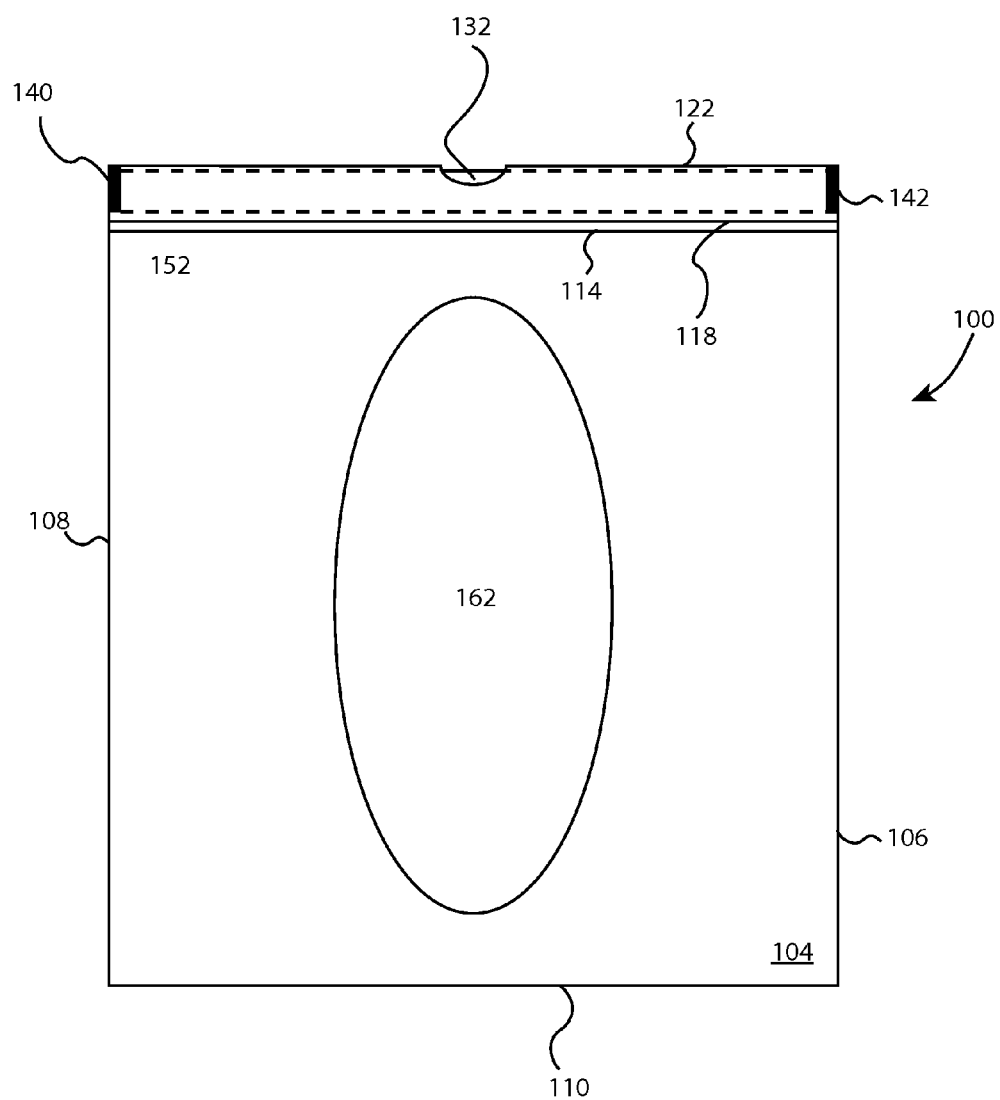
FIG. 2 depicts a back elevation view of an embodiment of the present invention.

Referring initially to FIG. 1 and FIG. 2, front and back elevation views of a drawstring trash bag 100 is shown according to one embodiment of the present invention. The drawstring trash bag 100 is formed from a first panel 102 and a second panel 104. The first panel 102 and second panel 104 are both generally rectangular in shape. To define the body of the bag, the first panel 102 and the second panel 104 are joined along a first side edge 106, a second side edge 108, and a bottom edge 110 of the respective first panel 102 and second panel 104.

In some embodiments, the first panel 102 and the second panel 104 may be formed from a single thermoplastic film folded to define a bottom edge 110 where the first panel 102 and the second panel 104 are joined. In such embodiments, the first panel 102 and second panel 104 may be joined by one or more seals extending along the first side edge 106 and the second side edge 108. In alternative embodiments, the first panel 102 and the second panel 104 may be formed of separate thermoplastic films joined by one or more seals extending along the first side edge 106, the second side edge 108, and the bottom edge 110 of the first panel 102 and the second panel 104. The various methods of constructing bags are well known in the art and any suitable method may be utilized.

For thermoplastic drawstring trash bags as shown in the depicted embodiment, a distal end 112 of the first panel 102 has been folded over to define the first hem 120 with a first hem seal 116 provided across the width of the drawstring trash bag 100. The first hem seal 116 also defines the bottom of the first hem 120. In this embodiment, a first drawstring 130 is disposed within the first hem 120, the first drawstring 130 extending across the width of the drawstring trash bag 100. Similarly, a second drawstring 132 is disposed within the second hem 122 defined by folding over the distal end 114 of the second panel. The second drawstring 132 extends across the width of the drawstring trash bag 100. In some embodiments, the ends of the first drawstring 130 and the second drawstring 132 are anchored to the upper corners of the drawstring trash bag 100 by providing short seals 140 and 142 welding together the first panel 102, the second panel 104, the first drawstring 130, and the second drawstring 132. It is contemplated that the drawstrings of the present invention may be either non-extensible or extensible drawstrings as known in the art.

Looking at FIG. 1, the first panel 102 features a first area of induced elasticity 160. The first area of induced elasticity 160 may be provided by any means known in the art. In certain embodiments of the present invention, the first area of induced elasticity 160 does not extend to or traverse the first side edge 106, the second side edge 108, nor the bottom edge 110 of the first panel 102. Additionally, in certain embodiments, the first area of induced elasticity 160 is elliptical or generally elliptical in shape. When the first area of induced elasticity 160 is stretched, the elliptical shape ensures that the forces exerted on the first area of induced elasticity 160 are more equally distributed along the boundary between the first area of induced elasticity 160 and the area lacking induced elasticity 150. Specifically, if the first area of induced elasticity 160 were square or had well-defined corners, a disproportionate amount of stress could result on certain parts of the area lacking induced elasticity 150 which, in turn, could cause a puncture, or facilitate the propagation of a tear, in the thermoplastic bag 100.

Looking now at FIG. 2, the second panel 104 may also features a second area of induced elasticity 162. The second area of induced elasticity 162 may be provided by any means known in the art. In the depicted embodiment, the second area of induced elasticity 162 does not extend to or traverse the first side edge 106, the second side edge 108, nor the bottom edge 110 of the first panel 102. Like the first area of induced elasticity 160, the second area of induced elasticity 162 may be elliptical or generally elliptical in shape to more equally distribute forces into the area lacking induced elasticity 152 in the second panel 104.

In the depicted embodiment, the capacity of the thermoplastic bag is increased without substantially compromising the dart impact properties of the film. As known in the art, dart properties refer to the amount of energy that causes plastic film to fail under specified conditions of impact of a free-falling dart. Testing of dart properties can be accomplished with reference to ASTM D1709-09, Standard Test Methods for Impact Resistance of Plastic Film by the Free-Falling Dart Method. In the context of thermoplastic garbage bags, dart properties are representative of the amount of energy that is required to cause the plastic film that forms the bag to fail when the contents, particularly sharper contents, are forced into the side of the bag by the mass within the bag or by a consumer pushing down on the contents of a thermoplastic bag. Thus, the measured dart impact properties of the thermoplastic film represent one important metric of the strength of the bag.

In some embodiments of the present invention including, but not limited to, the embodiments shown in FIG. 1 and FIG. 2, the first area of induced elasticity 160 in the first panel 102 may be between 10% and 30% of the total surface area of the first panel 102. Similarly, in some embodiments, the second area of induced elasticity 162 in the second panel 104 may be between 10% and 30% of the total surface area of the second panel 104. However, in other embodiments, the first area of induced elasticity 160 in the first panel 102 and the second area of induced elasticity 162 in the second panel 104 second panel may be between 20% and 25% of the total surface area of the respective first panel 102 or second panel 104. By reducing the area of induced elasticity to 30% or less, and preferably between 20% and 25%, the dart properties of the thermoplastic bag are not significantly adversely affected as would be exhibited by a bag with induced elasticity in greater than 50% of the surface area of the bag.

Embodiments of the present invention are preferably limited to thermoplastic bags having one or more panels where the area of induced elasticity is limited to 30% or less of the total surface area of the respective panel. Consequently, limiting the area of induced elasticity to 30% or less of the total surface area of a panel means the area of the respective panel lacking induced elasticity is at least 70%. Moreover, the area of the panel lacking induced elasticity is not thinned and, therefore, maintains dart impact properties that are diminished when a film is embossed and thinned to induce elasticity. The large percentage of total surface area for a panel that lacks induced elasticity results in substantially preserving the dart impact properties of the overall thermoplastic bag despite the area of induced elasticity.

As previously noted, the specific embodiments depicted herein are not intended to limit the scope of the present invention. Indeed, it is contemplated that any number of different embodiments may be utilized without diverging from the spirit of the invention. Therefore, the appended claims are intended to more fully encompass the full scope of the present invention.

I claim:

1. A thermoplastic bag comprising:
a first panel and a second panel, the first panel and the second panel joined along a first side edge, a second side edge, and a bottom edge,
the first panel having a first area of induced elasticity defined in the first panel with an area lacking induced elasticity surrounding the area of induced elasticity,
the first area of induced elasticity does not extend to the first side edge, the second side edge, nor the bottom edge of the first panel,
the first area of induced elasticity defining a perimeter, the perimeter consisting of an ellipse, and
the first area of induced elasticity covers between 10% and 30% of the first panel.

2. The thermoplastic bag of claim 1, further comprising:
the first area of induced elasticity covers between 20% and 25% of the first panel.

3. The thermoplastic bag of claim 1, further comprising:
the first area of induced elasticity comprises a plurality of embossed ribs.

4. The thermoplastic bag of claim 1, further comprising:
a second area of induced elasticity defined in the second panel, the second area of induced elasticity does not extend to the first side edge, the second side edge, nor the bottom edge of the second panel, and
the second area of induced elasticity covers between 10% and 30% of the second panel.

5. The thermoplastic bag of claim 4, further comprising:
the second area of induced elasticity covers between 20% and 25% of the second panel.

6. The thermoplastic bag of claim 4, further comprising:
the second area of induced elasticity is elliptical or generally elliptical in shape.

7. The thermoplastic bag of claim 4, further comprising:
the second area of induced elasticity comprises a plurality of embossed ribs.

8. A thermoplastic bag comprising:
a first panel and a second panel, the first panel and the second panel joined along a first side edge, a second side edge, and a bottom edge,
the first panel having a first area of induced elasticity defined in the first panel with an area lacking induced elasticity surrounding the area of induced elasticity,
the first area of induced elasticity does not extend to the first side edge, the second side edge, nor the bottom edge of the first panel, and
the first area of induced elasticity defining a perimeter, the entirety of the perimeter defining only an ellipse.

9. The thermoplastic bag of claim 8, further comprising:
the first area of induced elasticity covers between 10% and 30% of the first panel.

10. The thermoplastic bag of claim 9, further comprising:
the first area of induced elasticity covers between 20% and 25% of the first panel.

11. The thermoplastic bag of claim 8, further comprising:
the first area of induced elasticity comprises a plurality of embossed ribs.

12. A thermoplastic bag comprising:
a first panel and a second panel, the first panel and the second panel joined along a first side edge, a second side edge, and a bottom edge,
the first panel having a first area of induced elasticity defined in the first panel with an area lacking induced elasticity surrounding the area of induced elasticity,
the first area of induced elasticity does not extend to the first side edge, the second side edge, nor the bottom edge of the first panel, and
the first area of induced elasticity defining a perimeter, the perimeter consisting of an ellipse.

13. The thermoplastic bag of claim 12, further comprising:
the first area of induced elasticity covers between 20% and 25% of the first panel.

14. The thermoplastic bag of claim 12, further comprising:
the first area of induced elasticity comprises a plurality of embossed ribs.

15. The thermoplastic bag of claim 12, further comprising:
a second area of induced elasticity defined in the second panel, the second area of induced elasticity does not extend to the first side edge, the second side edge, nor the bottom edge of the second panel, and
the second area of induced elasticity covers between 10% and 30% of the second panel.

16. The thermoplastic bag of claim 15, further comprising:
the second area of induced elasticity covers between 20% and 25% of the second panel.

17. The thermoplastic bag of claim 15, further comprising:
the second area of induced elasticity is elliptical or generally elliptical in shape.

18. The thermoplastic bag of claim 15, further comprising:
the second area of induced elasticity comprises a plurality of embossed ribs.

* * * * *